Patented Apr. 25, 1939

2,155,446

UNITED STATES PATENT OFFICE 2,155,446

PROCESS FOR THE PRODUCTION OF β-METHYLCHOLINE ETHERS AND SALTS THEREOF

Georg Roeder, Rahway, N. J., assignor to Merck & Co. Inc., Rahway, N. J., a corporation of New Jersey No Drawing. Application January 30, 1937, Serial No. 123,152

8 Claims. (Cl. 260—584)

This invention relates to processes for the production of β-methylcholine ethers and their salts.

In U. S. Patent No. 2,049,463, issued August 4, 1936, there is described a process for preparing β-alkylated choline alkyl ether salts by reacting upon the corresponding alpha-alkyl-beta, bromomethyl alkyl ether with a solution of trimethylamine in benzene.

However, this process has the disadvantage that the bromides are always produced as primary products and that if other salts are desired they must be produced from the bromides.

I have now found a process for preparing these ethers of β-methylcholine and their salts which does not have the disadvantages of the known process, and by which the desired products may be obtained directly and in good yield.

Generally speaking, my process comprises reacting 1-chloro-2-alkoxypropane with dimethylamine, and then converting the tertiary base into the quaternary ammonium salt by reacting upon it with alkylating agents.

In the following examples, I am setting forth a detailed description of preferred methods of practicing my process for the ultimate production of certain salts of β-methylcholine ethyl ether. These examples are given by way of illustration and not limitation, and it will be understood that they may be modified in certain respects without departing from the spirit and scope of my invention.

Examples

1. About 1 mol. of 1-chloro-2-ethoxypropane and 2½ mols. of liquefied dimethylamine are heated in an autoclave at about 140° C. for 70 to 80 hours. The reaction mixture is mixed with benzol, the dimethylamine salt filtered off, and the benzene solution refluxed for some time to remove the excess of dimethylamine. The solution is cooled and extracted with hydrochloric acid (1 part of concentrated acid plus 1 part of water). The aqueous solution is neutralized with alkali and the base is salted out with solid potassium hydroxide. The oily 1-dimethylamino-2-ethoxypropane is separated and dried first with potassium hydroxide and then with barium oxide. It boils at about 125–135° C. The boiling point depends upon the extent to which the water is removed, and becomes higher with decrease in the water content.

The ether obtained is dissolved in benzol, methylbromide is added with cooling, and β-methylcholine ethyl ether bromide separates. It is allowed to stand for about 10 hours, and then filtered. The product occurs in the form of white, hygroscopic crystals melting at 130–132° C.

2. About 1 mol. of 1-chloro-2-ethoxypropane and 2½ mols. of liquefied dimethylamine are heated in an autoclave at about 140° C. for 70 to 80 hours. The reaction mixture is mixed with benzene, the dimethylamine salt filtered off, and the benzene solution refluxed for some time to remove the excess of dimethylamine. The solution is cooled and extracted with hydrochloric acid (1 part of concentrated acid plus 1 part of water). The aqueous solution is neutralized with alkali and the base is salted out with solid potassium hydroxide. The oily 1-dimethylamido-2-ethoxypropane is separated and dried first with potassium hydroxide, and then with barium oxide. It boils at about 125–135° C. The boiling point depends upon the extent to which the water is removed, and becomes higher with decrease in the water content.

The ether obtained is dissolved in benzol, and the solution placed under the pressure of a cylinder containing compressed methylchloride for about 10 hours at room temperature.

β-methylcholine ethyl ether chloride forms and is isolated in the usual manner. It occurs in the form of white hygroscopic crystals melting at about 132–134° C.

3. The solution of 1-dimethyl-amino-2-ethoxypropane in benzene obtained according to Examples 1 and 2 is treated with the calculated quantity of dimethyl sulfate. The methyl sulfate of β-methylcholine ethyl ether is obtained.

I claim as my invention:

1. A process for the production of salts of β-methylcholine ethers which comprises reacting 1-chloro-2-ethoxypropane with dimethylamine under the pressure generated by the reaction mixture at the operating temperature in a closed system, and converting the tertiary base into the quaternary ammonium salt by treatment with alkylating agents.

2. A process for the production of the bromide of β-methylcholine ethyl ether which comprises reacting 1-chloro-2-ethoxypropane with dimethylamine under the pressure generated by the reaction mixture at the operating temperature in a closed system, dissolving the ether thus obtained in benzol, and treating the solution with methylbromide to form the ether salt.

3. A process for the production of the chloride of β-methylcholine ethyl ether which comprises reacting 1-chloro-2-ethoxypropane with dimethylamine under the pressure generated by the reaction mixture at the operating temperature in a closed system, dissolving the ether thus obtained in benzol, and treating the solution with methylchloride to form the ether salt.

4. A process for the production of the methylsulfate of β-methylcholine ethyl ether which comprises reacting 1-chloro-2-ethoxypropane with dimethylamine under the pressure generated by the reaction mixture at the operating temperature in a closed system, dissolving the ether thus obtained in benzol, and treating the solution with dimethylsulfate to form the ether salt.

5. A process for the production of salts of β-methylcholine ethers which comprises reacting 1-chloro-2-ethoxypropane with dimethylamine in an autoclave at about 140° C., and converting the tertiary base into the quaternary ammonium salt by treatment with alkylating agents.

6. A process for the production of β-methylcholine ethyl ether bromide which comprises reacting 1-chloro-2-ethoxypropane with dimethylamine in an autoclave at about 140° C., dissolving the ether thus obtained, and treating the solution with methylbromide to form the ether salt.

7. A process for the production of β-methylcholine ethyl ether chloride which comprises reacting 1-chloro-2-ethoxypropane with dimethylamine in an autoclave at about 140° C., dissolving the ether thus obtained, and treating the solution with methylchloride to form the ether salt.

8. A process for the production of β-methylcholine ethyl ether methylsulfate which comprises reacting 1-chloro-2-ethoxypropane with dimethylamine in an autoclave at about 140° C., dissolving the ether thus obtained, and treating the solution with dimethyl sulfate to form the ether salt.

GEORG ROEDER.